United States Patent Office 3,206,446
Patented Sept. 14, 1965

3,206,446
PROCESS FOR MAKING ORGANIC BORON COMPOUNDS
Melville E. D. Hillman, Richmond, Calif., assignor to E. I. du Pont de Nemours and Company, Wilmington, Del., a corporation of Delaware
No Drawing. Filed June 4, 1962, Ser. No. 199,586
5 Claims. (Cl. 260—91.3)

This invention relates to a process and, more particularly, to a process for preparing organic boron compounds and certain compounds obtained thereby.

It is well known that the addition of boron compounds to gasoline produces beneficial effects on engine performance including an increase in octane number. However, few boron compounds are known which are sufficiently soluble to be incorporated into gasoline and which are stable to decomposition after incorporation.

This invention provides a method for synthesizing hydrolytically and air oxidatively stable liquid boron compounds which are soluble in gasoline and useful as fuel additives as well as certain new boron compounds useful for this purpose.

The process of this invention comprises heating a borane of the formula $R_3B$ wherein R is a 1 to 12 carbon atom radical bonded to boron through aliphatic carbon with carbon monoxide in the presence of an organic alcohol.

Illustrative R substituents in the boranes employed in the process of this invention are alkyl, for example, methyl, ethyl, n-propyl, isopropyl, n-butyl, isobutyl, secondary butyl, tertiary butyl, n-amyl, isohexyl, n-octyl, n-nonyl, n-decyl, n-undecyl, or n-dodecyl; cycloalkyl, for example, cyclohexyl or cyclopentyl; (cycloalkyl) alkyl, for example, cyclohexylmethyl or cyclopentylethyl; or aralkyl, for example, phenylethyl or phenylpropyl. The three R substituents or the boron can be the same or different. Illustrative boranes useful in the process of this invention include, for example, triethylborane, tripropylborane, triisopropylborane, tri-n-amylborane, triisoamylborane, tri-n-decylborane, tri-n-dodecylborane, cyclohexylmethyldiethylborane, methyldiethylborane, dimethylethylborane and diethylpropylborane as well as mixtures thereof.

The carbinyl esters obtained in accordance with this invention vary depending upon the particular alcohol employed. Because of the chaotic state of the nomenclature of boron compounds at the present time, the following structures are listed to identify the compounds described herein. For simplicity, the various R substituents on these compounds are named as alkyl substituents.

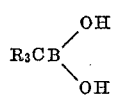

2,3,3,5,6,6-hexaalkyl-2,5-diboradioxane

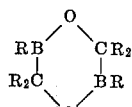

trialkylcarbinylboronic acid    dialkyl trialkylcarbinylboronate

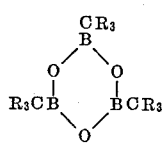

trialkylcarbinylboronic anhydride

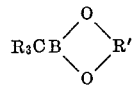

cyclic trialkylcarbinylboronic acid esters

Other boron compounds are named in accordance with "The Nomenclature of Boron," The Chemical Abstracts Service, Boron Nomenclature Committee, 1958.

When monoalcohols are employed, carbinyl boronates are formed according to the following equation:

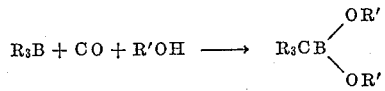

wherein R has the meaning specified hereinbefore and R'OH represents a monoalcohol bearing hydroxyl as the sole functional substituent.

When diols containing a pair of hydroxyl groups separated by an aliphatic chain of 2 to 4 carbon atoms are employed, new cyclic esters are obtained according to the following equation:

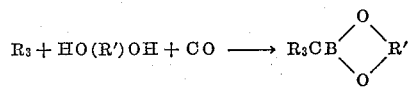

When polyols bearing more than one pair of hydroxyl groups separated by 2 to 4 carbons are used, new cyclic esters bearing more than one cyclic ester group are formed. Thus, with pentaerythritol,

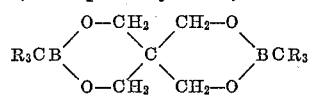

is formed. Similarly, with polymeric polyhydric alcohols, polymers having recurring cyclic ester units are obtained; for example, with polyvinyl alcohol, a polymer of the formula

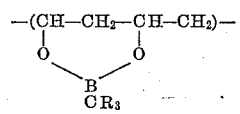

is obtained.

Thus, the new cyclic esters of this invention have the formula:

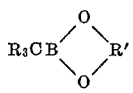

wherein R is a 1 to 12 carbon radical bonded to the ring through aliphatic carbon and R' is a radical bearing a chain of 2 to 4 aliphatic carbon atoms which joins the ring oxygen atoms. As indicated above, R' can contain one or more additional cyclic ester groups of the above formula. Thus, the cyclic esters can also be viewed as compounds having at least one cyclic ester group of the formula:

wherein the oxygen atoms are joined by an aliphatic chain of 2 to 4 carbon atoms. In polycyclic esters, the cyclic ester groups are preferably joined by saturated aliphatic radicals. In monocyclic esters, R' is preferably a saturated aliphatic hydrocarbon radical of 2 to 12 carbon atoms having 2 to 4 carbons in the ring, R is preferably a hydrocarbon radical, free of ethylenic unsaturation, especially an alkyl radical.

As indicated above, a wide variety of alcohols can be used in the process of this invention. Illustrative alcohols include monohydric alcohols of up to, for example, 20 or more carbon atoms, such as methanol, ethanol, isopropanol, n-propanol, n-butanol, isobutanol, n-octanol, n-dodecanol, cyclohexanol, cyclohexylethanol, phenol and phenylethanol; diols such as ethylene glycol, 1,3-propanediol, propylene glycol, 1,4-butanediol, 1,3-butanediol, 2,3-butanediol and diethyleneglycol; triols such as glycerine and 1,2,6-hexanetriol; tetrols such as erythritol and pentaerythritol; other polyols such as sorbitol and mannitol and polymeric polyols such as polyvinyl alcohol.

Usually, at least one equivalent of alcohol, that is, two moles of monoalcohol, one mole of diol, etc., is used for each mole of borane. There is no upper limit on the amount of alcohol used except that imposed by economics of alcohol recovery and the space-time yield requirements of the reaction vessel. The alcohol can be used alone or can be admixed with non-reactive solvents such as acetone, dioxane, ether, n-pentane, benzene and the like.

The temperature of reaction can range from about 25° C. to about 200° C. or higher. The higher the temperature the faster the reaction so that higher temperatures, i.e., above about 125° C. are preferred. Also, if the reaction temperature is relatively low, for example, 25 to 125° C., a large proportion of diboradioxane may be obtained during the course of the reaction. This diboradioxane can be converted to the desired ester by continued heating with alcohol at higher temperatures, for example, up to 200° C. Alternatively, diboradioxane can be converted to the corresponding carbinylboronic anhydride by separating it from the reaction mixture and heating it in the presence of water at a temperature of, for example, 125 to 200° C. The carbinylboronic anhydride can then be heated, preferably at temperatures above 125° C., with the desired alcohol to yield an ester obtained in accordance with this invention. At reaction temperatures of, for example, 125 to 200° C., substantial proportions of carbinylboronic anhydride may be obtained if the reaction is not carried to completion. As indicated above, such carbinylboronic anhydride can be converted to the corresponding ester by continued heating in the presence of the alcohol.

The pressure of carbon monoxide, that is, the reaction time is determined completely by the reaction temperature and by the pressure of carbon monoxide. Generally, the reaction will be allowed to proceed until the greater part of the trialkylborane is converted to the boronic ester.

The products of the present invention are recovered from the reaction mixture by conventional means. Distillation, generally under reduced pressure, is a convenient, cheap and usable means for isolating the products. When glycols are employed in the reaction an ether extraction of the glycol layer is generally employed, followed by washing the ether layer with water to remove traces of glycol, drying the ether layer by a suitable chemical drying agent, such as $CaSO_4$ then distilling the products.

The process of this invention provides a method of obtaining esters of carbinylboronic acids in high yields. The esters of the present invention can be oxidized with alkaline hydrogen peroxide to give trialkylcarbinols which can be reacted, for example, with polybasic acids such as aliphatic dicarboxylic acids, to yield high boiling ester lubricants. The acyclic and monocyclic esters of this invention are hydrolytically and air oxidatively stable liquids soluble in gasoline and are useful as gasoline additives for improving octane number. Polymeric esters of this invention are useful in making films, coatings and fibers.

In the following more specific working examples which illustrate this invention, parts and percentages are by weight unless otherwise indicated.

*Example 1*

A stainless steel vessel is charged with 120 parts of tri-n-butylborane and 100 parts of ethylene glycol and pressurized to 700 atmospheres with carbon monoxide. The vessel is then heated to 150° C. and agitated for two hours at this temperature. The contents of the vessel are then removed and distilled giving 2-tri-n-butyl-carbinyl-1,3,2-dioxaborolane in 59% yield boiling at 95–98° C. at 0.6 mm. and tri-n-butylcarbinylboronic anhydride in 36% yield boiling at 100–165° C. at 0.6 mm.

*Examples 2 to 10*

The general procedure of Example 1 is followed using the ingredients, temperatures, and pressures listed with the listed results.

| Example | Glycol used | Trialkylboron | Temp., °C. | CO Press. (atm.) | Ready time (hrs.) | Products obtained | Boiling point, ° C. | Yield percent |
|---|---|---|---|---|---|---|---|---|
| 2 | Ethylene glycol | Triethyl | 150 | 650 | 2 | 2-triethylcarbinyl-1,3,2-dioxaborolane. | 50–52 at 0.5 mm | 94.3 |
| 3 | 1,3-propane-diol | do | 150 | 810 | 2 | 2-triethylcarbinyl-1,3,2-dioxaborinane. | 55–58 at 0.65 mm | 95.0 |
| 4 | 1,4-butane-diol | do | 150 | 650 | 2 | {2-triethylcarbinyl-1,3,2-dioxaboracycloheptane. / Triethylcarbinylboronic anhydride. | 66–70 at 0.5 mm / 120–125° at 0.6 mm | 49.0 / 34.0 |
| 5 | 2,3-butane-diol | do | 150 | 665 | 2 | 2-triethylcarbinyl-4,5-dimethyl-1,3,2-dioxaborolane. | 46–50 at 0.5 mm | 90.0 |
| 6 | 1,3-butane-diol | do | 150 | 665 | 2 | 2-triethylcarbinyl-4-methyl-1,3,2-dioxaborinane. | 62–72 at 0.5 mm | 90.0 |
| 7 | Pentaerythritol | do | 150 | 890 | 2 | 3,9-bis (triethylcarbinyl)-3,4,8,10-tetroxa-3,9-diborspiro[5.5] undecane. | 76–76.8 [1] | 49.0 |
| 8 | Diethylene glycol | do | 150 | 870 | 2 | Triethylcarbinylboronic anhydride. | 119–128 at 0.35 mm | 92.0 |
| 9 | Ethylene glycol | Tri-isobutyl | 150 | 700 | 2 | {2,3,3,5,6,6-hexaisobutyl-2,5-diboradioxane. / 2-triisobutylcarbinyl-1,3,2-dioxaborolane. | 134–150 at 0.7 mm / 82–100 at 0.7 mm | 32.0 / 65.0 |
| 10 | do | Tri-n-hexyl | 150 | 925 | 2 | 2-tri-n-hexylcarbinyl-1,3,2-dioxaborolane. | 136–143 at 0.2 mm | 49.0 |

[1] Melting point.

pressure can vary from about 1 atmosphere to about 1000 atmospheres or higher, although pressures higher than this upper limit require excessively expensive pressure reaction vessels. The preferred pressure range is from about 100 atmospheres to about 900 atmospheres. The carbon monoxide can be diluted with gases inert toward the reaction such as nitrogen; however, in such case, the partial pressure of the carbon monoxide should be at least about one atmosphere during the entire reaction.

When the procedure of Example 3 is used with tribenzylborane, tricyclohexylborane, or tri(cyclohexylmethyl)borane replacing the triethylborane, similar results are obtained.

*Example 11*

A stainless steel reaction vessel is charged with 50 parts of triethylborane and 56 parts of ethanol. The reactor is pressurized with carbon monoxide to 700 atmospheres slowly to prevent excessive heat build-up, heated and agitated at 50° C. for 1 hour. The contents of the vessel are removed and distilled to give 2,3,3,5,6,6-hexaethyl-2,5-diboradioxane boiling at 114° C. at 11 mm. pressure in 85% yield.

The diboradioxane is converted to triethylcarbinylbornonic anhydride by heating in water at 150° C. for 2 hours and distilling. The anhydride is converted to the diethyl triethylcarbinylboronate by refluxing in ethanol for 2 hours followed by distillation.

*Example 12*

A stainless steel reaction vessel is charged with 49 parts of triethylborane and 56 parts of ethanol. It is then pressurized with carbon monoxide to 700–800 atmospheres, heated to 150° C. and agitated for two hours at that temperature. The contents of the vessel are then removed and distilled. Diethyl triethylcarbinyl boronate (10% yield) boiling at 70–90° C. at 0.37 mm. pressure and triethylcarbinylboronic anhydride (89% yield) boiling at 123–135° C. at 0.37 mm. are obtained.

This anhydride is converted to diethyl triethylcarbinylboronate by refluxing in ethanol.

*Example 13*

A stainless steel vessel is charged with 44 parts of polyvinyl alcohol, 80 parts of ethanol and 50 parts of triethylborane, and pressurized with carbon monoxide to 810 atmospheres. It is then heated and agitated for four hours at 150° C. When the vessel is opened it is full of a white foamy elastic solid and some liquid. The liquid is distilled to give a 37% yield of triethylcarbinylboronic anhydride. The solid is soluble in ether, benzene, tetrahydrofuran, carbon tetrachloride and n-pentane; slightly soluble in ethanol, acetone and dimethylformamide and insoluble in water. Analysis of the polymer shows the following:

Calcd. for $(C_{11}H_{21}BO_2)_n$: C, 67.37; H, 10.80; B, 5.52. Found: C, 65.66; H, 11.06; B, 4.55.

The analysis corresponds to 82% of the theoretical boron content.

Solutions of this polymer in benzene are cast into water-insoluble films and are drawn to give fibers.

I claim:
1. A process which comprises heating a borane of the formula $R_3B$ wherein R is a 1 to 12 carbon atom radical bonded to boron through aliphatic carbon with carbon monoxide in the presence of an hydroxyl-substituted hydrocarbon at a temperature of about from 25 to 200° C. and at a pressure of from about 1 to about 1000 atmospheres.
2. A process of claim 1 wherein said alcohol is a polyhydric alcohol bearing a pair of hydroxyl groups separated by an aliphatic chain of 2 to 4 carbon atoms.
3. A process of claim 2 wherein the reaction temperature is about from 125 to 200° C. and the reaction pressure is about from 100 to 900 atmospheres.
4. A process of claim 1 wherein the hydroxyl-substituted hydrocarbon is a saturated, aliphatic alcohol of 2 to 12 carbons.
5. A process of claim 1 wherein the hydroxyl-substituted hydrocarbon is a polyol bearing more than one pair of hydroxyl groups separated by a saturated, aliphatic chain of 2 to 4 carbons.

References Cited by the Examiner

UNITED STATES PATENTS

| | | | |
|---|---|---|---|
| 2,457,603 | 12/48 | Salzberg et al. | 260—91.3 |
| 2,710,252 | 6/55 | Darling | 260—462 |
| 3,006,961 | 10/61 | Reppe et al. | 260—606.5 |
| 3,038,926 | 6/62 | Farthouat | 260—462 |

FOREIGN PATENTS 848,519   9/60   Great Britain.

OTHER REFERENCES

Hillman: "Jour. American Chem. Soc.," vol. 84, December 1962, pages 4715–20.

Hillman: "Jour. American Chem. Soc.," vol. 85, April 1963, pages 982–4.

MURRAY TILLMAN, *Primary Examiner.*

CHARLES B. PARKER, *Examiner.*